April 26, 1938.  J. F. GUTMANN  2,115,261
WINDOW CONSTRUCTION
Filed May 6, 1933    2 Sheets-Sheet 1
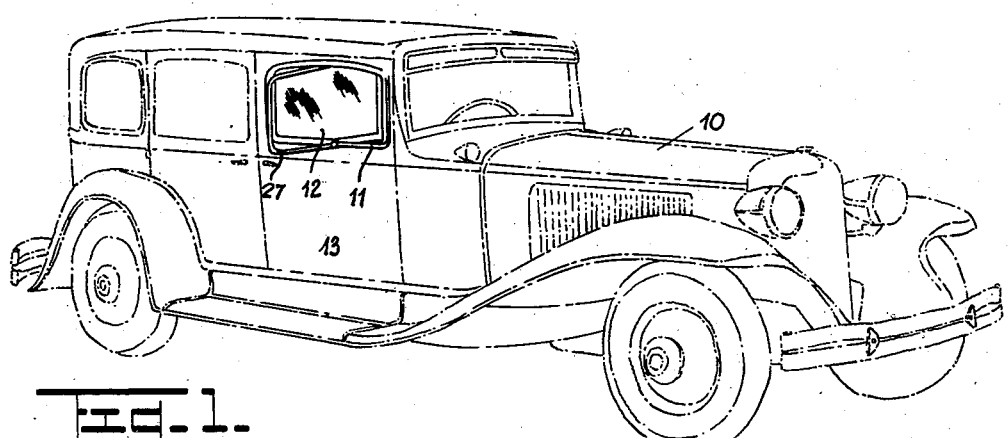
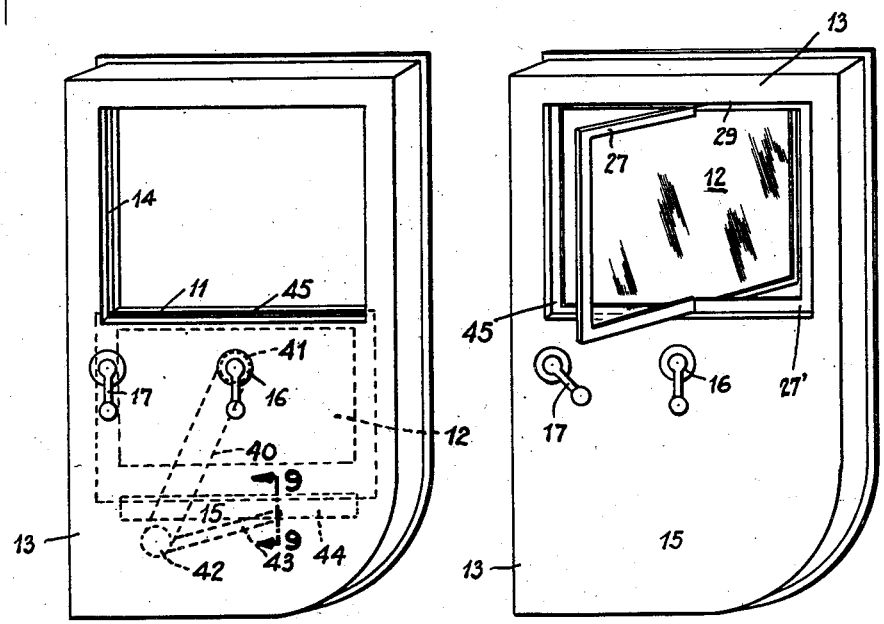
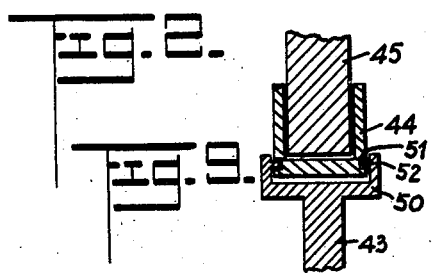
INVENTOR.
JOHN F. GUTMANN.
BY
ATTORNEY.

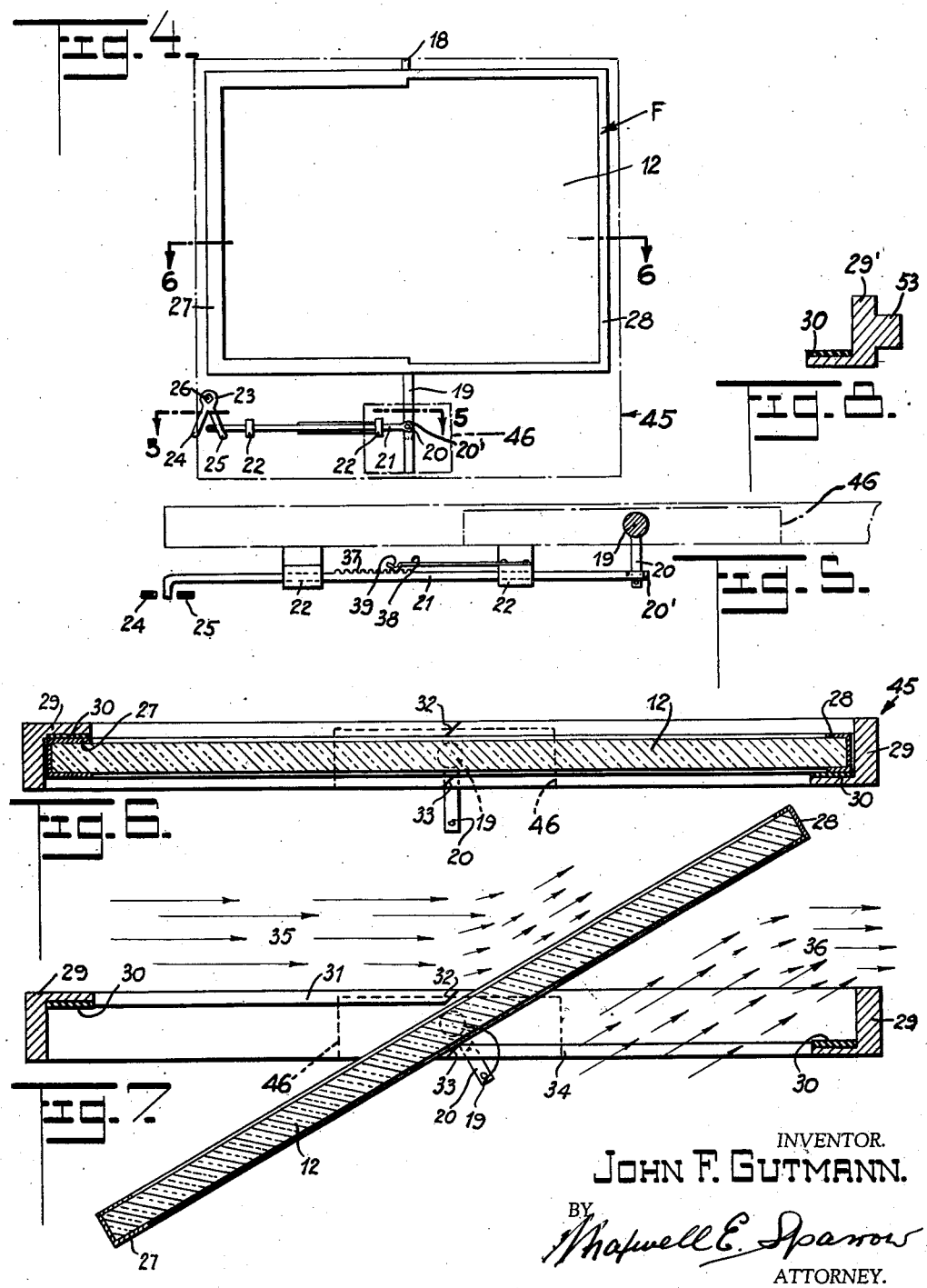

Patented Apr. 26, 1938

2,115,261

UNITED STATES PATENT OFFICE 2,115,261

WINDOW CONSTRUCTION

John F. Gutmann, St. Albans, N. Y., assignor of one-half to Reynold Goodman, New York, N. Y.

Application May 6, 1933, Serial No. 669,678

6 Claims. (Cl. 296—44)

This invention relates generally to improvements in window construction, and particularly to the horizontally-swinging type.

It is a known fact that air within vehicle bodies not properly ventilated will cause drowsiness of the occupants. With respect to the driver of the vehicle, this drowsiness may at times create actual dangerous conditions especially in the case of sudden emergencies. On account of the present ventilating means of vehicles, the driver of such vehicles in many instances prefers to keep the vehicle body closed or in other words, not properly ventilated, than to be subjected to discomforting drafts. To overcome this drafty condition of present day ventilation, I have invented the hereindescribed novel window construction which is applicable to motor vehicles, aircrafts, trains, boats, trolley cars, etc.

The window construction which I propose allows the window to be opened and closed in a vertical as well as a horizontal direction, the window being adapted to be horizontally-swung at an angle which will give a no-draft ventilation, so that the relative forward movement of the vehicle with respect to the outside atmosphere will cause the air rushing past the opening in the window to induce a suction to facilitate the air within the vehicle body being drawn out, thereby ridding the vehicle compartments of all foul air and gases and leaving only clear and fresh air in its stead; the window in said open position also acting as a deflector upon the air and flying particles commingled therewith which the vehicle contacts with during its forward movement and causes them to be deflected away from the vehicle.

It is, therefore, an object of this invention to provide a simple, efficient and economical window construction suitable for application to the door or body of vehicles and capable of permitting proper ventilation of the space within the vehicle body, eliminating undesirable air currents and drafts.

A further object of this invention is to provide a window construction which will give a no-draft ventilation, the window being adapted to be opened and closed in a vertical direction and horizontally-swung at an angle, and mechanism to facilitate the horizontal-swinging of the window.

A further object of this invention is to combine the advantages of a horizontally-swinging with a sliding window in a vehicle, to give a no-draft ventilation, the window being operable from a point within the body remote from the window.

These and other objects of the invention and the means for their attainment will be more apparent from the following detailed description, taken in connection with the accompanying drawings, illustrating a preferred embodiment by which the invention may be realized, and in which:

Fig. 1 illustrates a typical application of the invention to the door of a motor vehicle.

Fig. 2 is a detail view in perspective of a motor vehicle door with the window in raised position.

Fig. 3 is a view similar to the one shown in Figure 2 with the window in raised and horizontally-swung position.

Fig. 4 is a view showing a form of the window construction.

Fig. 5 is a sectional view along lines 5—5 of Figure 4.

Fig. 6 is a sectional view along lines 6—6 of Figure 4, the window being in closed position.

Figure 7 is a similar view to Figure 6 with window in operating position and illustrating the flow of air produced by the induced suction.

Fig. 8 is a view showing a modified frame construction making the window adaptable to be interchanged in present vehicle bodies.

Fig. 9 is a sectional view along lines 9—9 of Figure 2, showing details of window raising mechanism.

In the drawings, in which like numerals refer to like parts, the numeral 10 represents a motor vehicle having a door 13, provided with a window opening 11 in which a glass panel 12 mounted in an inner frame F pivoted on a vertical axis in outer frame for horizontally-swingable movement. The door 13 is provided with the conventional channels 14 in which outer frame 45 is slidably mounted. Door 13 is also provided with the conventional pocket formed between its outer and inner walls 15, which pocket contains the window raising and lowering mechanism and is adapted to receive the complete window in its lowered or receding position. Handle 16 is provided to perform the function of vertically raising and lowering the window frame 45. Handle 17 is provided on the inside of the door 13 for the purpose of horizontally turning or swinging the said window when in raised position to the proper desired angle. The frame F has one section 27 slightly wider than the other section 28, the section 27 conforming with the moulding 27' on the inside of the outer frame 45. The inner frame F is pivotally mounted in the outer frame 45 to swing on a vertical axis. For this purpose the top and bottom fulcrum or pivot pins 18, 19 respectively, may be fastened to inner frame F for rotation in suitable sockets provided in outer frame 45. Fulcrum or pivot pin 19 is longer than pin 18 and is pivotally connected to an operating rod 21 at 20' by means of a lever arm 20. Supports 22 secure the operating rod 21 to the frame member 45. Handle 17 connects to a bifurcated lever 23 having forked members 24 and 25. A square hole 26 is provided in lever 23 to fixedly connect the same to handle 17. Frame member 45 consists of L-shaped members 29. Suitable weather stripping 30 is provided on outer frame 45 where the latter engages the inner frame F when in closed position. The bottom upright L portions 31 and 34 extend to the center of the frame where they are bevelled as indicated at 32 and 33.

The bevels 32 and 33 will provide the proper angle for the maximum horizontal swinging of the window 12, which is preferably fixed at an angle of forty-five degrees to provide no-draft ventilation.

Arrows 35 indicate the flow of air on the outside of the vehicle, while arrows 36 indicate the air within the vehicle body which is drawn out by the suction induced by the air rushing past the opening in the window.

To prevent window 12 being opened beyond the predetermined angle of opening, which as heretofore stated may be forty-five degrees, the rod 21 is provided with a ratchet portion 37 and one of the supports 22 is provided with a spring member 38 having a V-shaped end 39 which engages the notches in ratchet 37.

It is understood that the resistance of spring member 38 is sufficient to hold window 12 at its proper predetermined angle but at the same time will not offer too great a resistance to the operation of the same. The raising and lowering device within compartment 15 of the door or car body consists in one typical form of an endless chain 40 engaging with gear 41 connected to handle 16 and gear 42 connectedly engaged to arm 43. The window frame 45 rests in a channel member 44. Window frame 45 is provided with an opening pocket 46 to give necessary clearance to the operating mechanism and in particular to lever 20. The arm 43 is provided with a forked member 50 having pins 52 slidably connected in groove 51 of panel member 44. While the drawings show the invention applied to the door of a motor vehicle, it is evident, however, that the same may be applied to other windows in vehicle bodies.

Where it is desired to apply the invention to present vehicle bodies wherein channel 14 is not wide enough to receive window unit 45, L member 29' may be provided its entire length with a narrow guide strip 53.

The operation of the device is simple. If the window is open from the top, then handle 16 is turned to raise the window to its completely closed position. When the window is in this position rod 21 is located between the prongs 24 and 25 of bifurcated member 23 secured to operating handle 17. Turning handle 17 causes member 23 to operate the mechanism on the outer frame 45 for horizontally swinging the window to open position. The handle 17 being attached to the body or door of the vehicle provides a remote control for horizontally swinging the window into open and closed positions.

It is understood that the inner frame of the window may be constructed to pivot at any desired points on the outer frame. It is further understood that the invention is applicable to a non-slidable window or a window which is made to open by raising rather than lowering the same, or by sliding sideways.

It is believed from the above description that those skilled in the art will have no difficulty in understanding the construction, the method of use and operation of the device herein disclosed and a further detailed discussion thereof is unnecessary. The invention is of simple and practical construction and is adapted to accomplish among others all of the objects and advantages herein set forth.

Without further analysis, the foregoing will so fully reveal the gist of this invention that others can by applying current knowledge readily adapt it for various applications without omitting certain features, that, from the standpoint of the prior art, fairly constitute essential characteristics of the generic or specific aspects of this invention, and therefore, such adaptations should and are intended to be comprehended within the meaning and range of equivalency of the following claims.

I claim:—

1. In combination, a vertically-slidable window frame, a horizontally-swingable glass carrying frame mounted in the vertically-slidable window frame, means to operate said window frame for sliding movement, means to operate said glass carrying frame for swinging movement, and separate control means for actuating said first and second means respectively from points remote from said window.

2. In combination with a vehicle body, a vertically-slidable window frame, an operating handle for raising and lowering said frame, a horizontally-swingable glass carrying frame mounted in said vertically-slidable window frame, mechanism for turning the glass carrying frame on its axis, and including a lever arm carried by the vertically-slidable window frame, and an additional handle mounted on the vehicle body for engagement with the lever arm only when the sliding window frame is in a raised position, whereby the glass carrying frame may be swung.

3. In combination with a vehicle body, a vertically-slidable window frame, an operating handle for raising and lowering said frame, a horizontally-swingable glass carrying frame mounted in said vertically-slidable window frame, mechanism for turning the glass carrying frame on its axis, and including a lever arm carried by the vertically-slidable window frame, an additional handle rotatably mounted on the vehicle body, and a member attached to said last mentioned handle for engagement with the lever arm only when the sliding window frame is in a raised position, whereby the glass carrying frame may be swung upon the actuation of the rotary handle.

4. In combination with a vehicle body, a vertically-slidable window frame, an operating handle for raising and lowering said frame, a horizontally-swingable glass carrying frame mounted in said vertically-slidable window frame, mechanism for turning the glass carrying frame on its axis, and including a lever arm carried by the vertically-slidable window frame, an additional handle rotatably mounted on the vehicle body, a member attached to said last mentioned handle for engagement with the lever arm only when the sliding window frame is in a raised position, whereby the glass carrying frame may be swung upon the actuation of the rotary handle, and means for automatically retaining the horizontally-swingable glass carrying frame in its swung position.

5. In combination with a vehicle body, a vertically slidable window frame, a glass carrying frame pivotally mounted in the sliding frame to swing on a vertical axis, an operating handle for raising and lowering the sliding frame, a second operating handle on the vehicle body, mechanism connecting said second handle and the glass carrying frame to turn the latter on its axis by actuating the second handle, said mechanism being disposed in position to be operated by the second handle only when the sliding frame is in a fully raised position.

6. In combination with a vehicle body having a pocket, a vertically slidable frame for movement into an out of said pocket, an operating handle raising and lowering the slidable frame, a horizontally swingable glass carrying frame mounted in said slidable frame, mechanism located in said pocket and carried by the sliding frame for swinging the glass carrying frame, an additional handle mounted on the vehicle body and projecting into the pocket for actuating said mechanism, the mechanism being disconnected from the second mentioned handle while the sliding frame is in a lowered position, and operatively connected with said additional handle only when the sliding frame is in a fully raised position.

JOHN F. GUTMANN.